(12) United States Patent
Ide

(10) Patent No.: US 11,042,244 B2
(45) Date of Patent: Jun. 22, 2021

(54) TERMINAL DEVICE AND TOUCH INPUT METHOD

(71) Applicant: Sony Mobile Communications Inc., Minato-ku (JP)

(72) Inventor: Yuji Ide, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 116 days.

(21) Appl. No.: 13/863,805

(22) Filed: Apr. 16, 2013

(65) Prior Publication Data

US 2013/0278554 A1 Oct. 24, 2013

Related U.S. Application Data

(60) Provisional application No. 61/637,590, filed on Apr. 24, 2012.

(51) Int. Cl.
*G06F 3/044* (2006.01)

(52) U.S. Cl.
CPC .... *G06F 3/044* (2013.01); *G06F 2203/04104* (2013.01); *G06F 2203/04106* (2013.01)

(58) Field of Classification Search
CPC ...... G06F 3/041; G06F 3/0421; G06F 3/0488; G06F 3/044; G06F 3/046; G06F 3/0412
USPC ................................ 345/156, 173–175, 179; 178/18.01–18.05, 19.01–19.07
See application file for complete search history.

(56) References Cited

U.S. PATENT DOCUMENTS

| | | | |
|---|---|---|---|
| 4,686,332 A * | 8/1987 | Greanias et al. | 345/173 |
| 5,231,381 A * | 7/1993 | Duwaer | 345/174 |
| 5,402,151 A * | 3/1995 | Duwaer | 345/173 |
| 6,417,846 B1 * | 7/2002 | Lee | 345/173 |
| 6,492,979 B1 * | 12/2002 | Kent et al. | 345/173 |
| 6,504,530 B1 * | 1/2003 | Wilson et al. | 345/173 |
| 6,762,752 B2 * | 7/2004 | Perski et al. | 345/173 |
| 8,482,545 B2 * | 7/2013 | King-Smith et al. | 345/174 |
| 8,624,847 B2 * | 1/2014 | Ely | 345/173 |
| 2004/0176047 A1 * | 9/2004 | Trively | H04M 1/0245 455/90.3 |
| 2006/0012580 A1 | 1/2006 | Perski | |
| 2007/0152976 A1 | 7/2007 | Townsend et al. | |
| 2007/0242056 A1 * | 10/2007 | Engelhardt et al. | 345/173 |
| 2007/0285404 A1 * | 12/2007 | Rimon | G06F 3/044 345/173 |

(Continued)

FOREIGN PATENT DOCUMENTS

| | | | |
|---|---|---|---|
| EP | 1 659 481 A2 | 5/2006 | |
| EP | 1659481 A3 | 6/2011 | |

(Continued)

OTHER PUBLICATIONS

European Search Report (partial) for Application No. 13164519.4, dated Feb. 10, 2017.

(Continued)

*Primary Examiner* — Ricardo Osorio

(74) *Attorney, Agent, or Firm* — Xsensus LLP

(57) ABSTRACT

An information processing including a display; a first sensor configured to detect a first object that comes into contact with or approaches the display based on a change in a magnetic field; and a second sensor configured to detect a second object that comes into contact with or approaches the display based on a change in capacitance or resistance.

16 Claims, 8 Drawing Sheets

(56) References Cited

U.S. PATENT DOCUMENTS

| | | | |
|---|---|---|---|
| 2008/0012835 A1* | 1/2008 | Rimon | G06F 3/0416 345/173 |
| 2008/0012838 A1* | 1/2008 | Rimon | G06F 3/044 345/174 |
| 2008/0046425 A1* | 2/2008 | Perski | 707/6 |
| 2009/0251434 A1* | 10/2009 | Rimon et al. | 345/173 |
| 2009/0293007 A1* | 11/2009 | Duarte | G06F 3/0482 715/767 |
| 2010/0155153 A1* | 6/2010 | Zachut | 178/18.03 |
| 2010/0185989 A1* | 7/2010 | Shiplacoff | G06F 3/04886 715/856 |
| 2010/0214257 A1* | 8/2010 | Wussler et al. | 345/174 |
| 2011/0131502 A1* | 6/2011 | Ryu | G06F 3/04815 715/744 |
| 2011/0310031 A1* | 12/2011 | Harris | G06F 3/0383 345/173 |
| 2012/0068964 A1* | 3/2012 | Wright et al. | 345/174 |
| 2012/0105361 A1* | 5/2012 | Kremin | G06F 3/044 345/174 |
| 2013/0104054 A1* | 4/2013 | Cao | G06F 3/038 715/753 |
| 2013/0125068 A1* | 5/2013 | Harris | G06F 3/017 715/863 |
| 2013/0207938 A1* | 8/2013 | Ryshtun et al. | 345/179 |
| 2013/0241847 A1* | 9/2013 | Shaffer | G06F 3/04883 345/173 |
| 2013/0286033 A1* | 10/2013 | Mesaros | G06F 3/03545 345/589 |
| 2016/0019424 A1* | 1/2016 | Liu | G06F 3/04886 345/176 |

FOREIGN PATENT DOCUMENTS

| | | |
|---|---|---|
| JP | 2008-152640 | 7/2008 |
| JP | 2011-164746 A | 8/2011 |

OTHER PUBLICATIONS

Ken Hinckley et al. "Pen + touch = new tools", UIST '1-: Proceedings of the Twenty-Third Annual ACM Symposium on User Interface Software and Technology, ACM, US Oct. 3, 2010 (Oct. 3, 2010), pp. 27-36.

Extended Search Report issued in Application No. 13164519.4, dated May 31, 2017, 37 pages.

Apple Keynote Demo: "Apple iPad Gestures", Mar. 31, 2010, p. 1, XP054977380, retrieved from the Internet: URL:https://www.youtube.com/watch?v=uy_yr XGExM [retrieved on May 23, 2017].

* cited by examiner

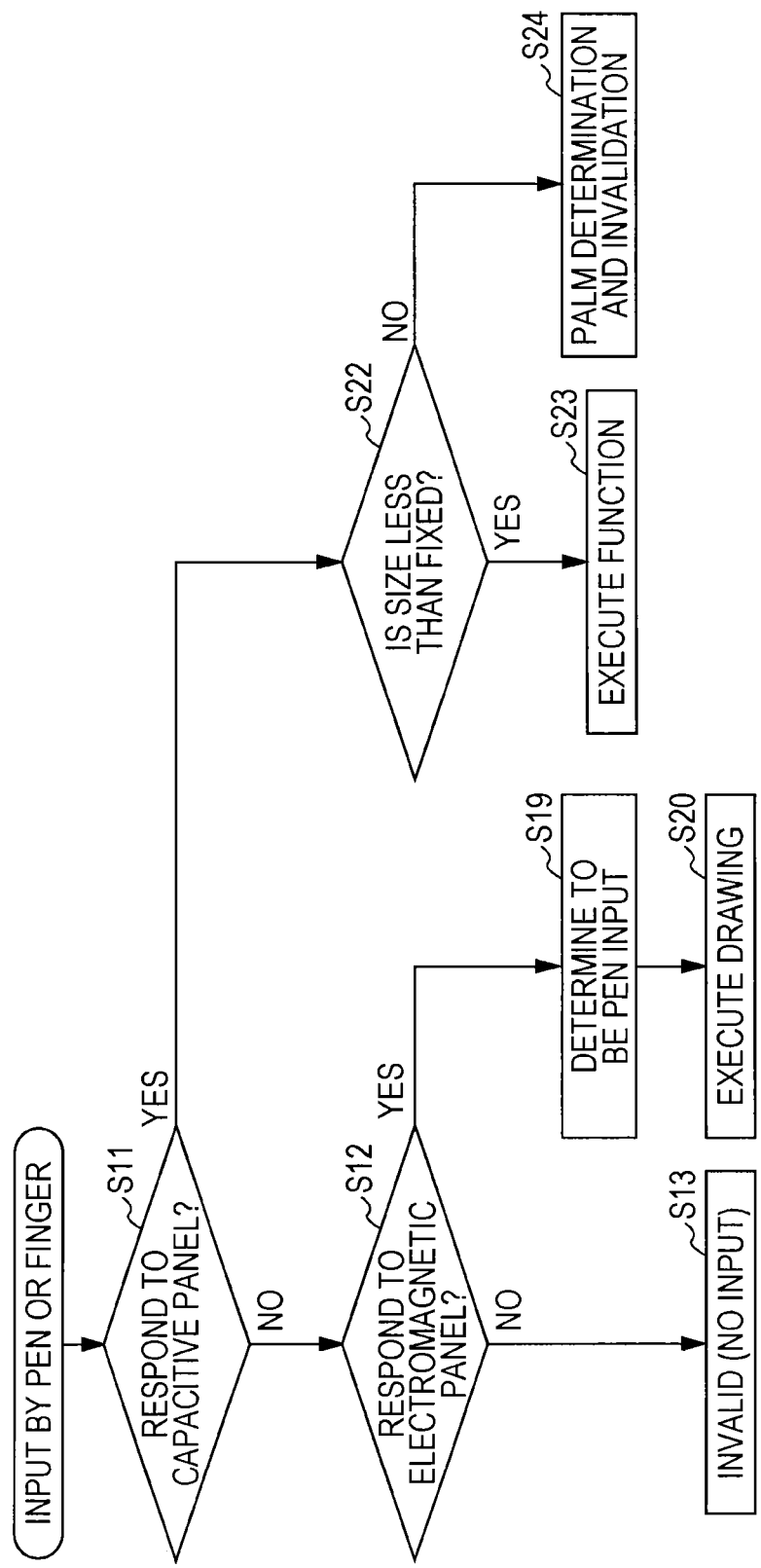

TERMINAL DEVICE AND TOUCH INPUT METHOD

CROSS REFERENCE TO RELATED APPLICATION

The present application claims the benefit of the earlier filing date of U.S. Provisional Patent Application Ser. No. 61/637,590 filed on Apr. 24, 2012, the entire contents of which is incorporated herein by reference.

BACKGROUND

1. Field of the Disclosure

The present disclosure relates to a terminal device including a touch panel, and a touch input method applied to the terminal device.

2. Description of Related Art

A terminal device such as a mobile phone terminal device often includes a touch panel stacked on or integrated into a display panel. For the terminal device including such a touch panel, a user can perform an input operation by touching a position where the touch panel is provided with a finger or a pen. For example, the display panel of a terminal device displays keys provided to input characters or numerals. Then, a touch panel detects a touch made at the position where the keys are displayed, so that processing aimed to input the characters or numerals corresponding to the displayed keys is performed.

The terminal device including such a touch panel can perform various input operations in accordance with the display mode of the display panel. Consequently, the terminal device including the touch panel is appropriate for a multifunctional terminal device.

Touch panels that are achieved under various systems have been commercialized. For example, a touch panel configured to detect a change in capacitance or resistance, which is caused by a finger, etc. that approaches the touch panel, has been available. A touch panel configured to detect the capacitance change is referred to as a capacitive system. A touch panel configured to detect the resistance change is referred to as a resistive film system. The touch panel achieved under the capacitive system includes a transparent electrode arranged on the touch panel, and detects a touch position based on a change in the capacity of the electrode. The touch panel achieved under the resistive film system includes a transparent electrode arranged on the touch panel, and detects a touch position based on a change in the resistance value of the electrode.

Further, there has been a touch panel referred to as an electromagnetic induction system. For the electromagnetic induction system, loop coils that are configured to generate a specified magnetic field are arranged around a display panel, and a user performs a touch operation with a specifically designed operation pen. A resonant circuit component including a coil and a capacitor is provided in the operation pen. Then, a detection circuit connected to the loop coils detects a change in the magnetic field, which is caused by the approach of the pen, and acquires the position where the pen approaches. Due to its capability of detecting a position or distance of an approaching pen with high precision, the touch panel achieved under the electromagnetic induction system is used in combination with, for example, graphic software for drawing a picture, etc., on the screen image with the pen.

In Japanese Unexamined Patent Application Publication No. 2008-152640, an input device allowing a touch operation, which includes both the touch panel achieved under the capacitive system and the touch panel achieved under the electromagnetic induction system, is disclosed. By thus providing both the touch panel achieved under the capacitive system and the touch panel achieved under the electromagnetic induction system in a terminal device, it becomes possible to make a single device adaptable for both a touch operation performed with a finger and a touch operation performed with a specifically designed pen.

SUMMARY

When a terminal device includes both a touch panel achieved under the capacitive system and a touch panel achieved under the electromagnetic induction system, some kind of measure needs to be taken to reduce interaction between performances of the respective touch panels. According to a technique described in Japanese Unexamined Patent Application Publication No. 2008-152640, for example, detection performed under the capacitive system is stopped when the touch panel achieved under the electromagnetic induction system detects the existence of a pen, which reduces interaction between the two systems.

However, the perfect switching between the two systems for use often does not allow for bringing out the best in the two systems. For example, it is impossible for a user to perform an operation through the use of a pen provided for the electromagnetic induction system, the operation including touching an icon provided on a screen image with a finger of the hand holding the pen while the user draws something with the pen.

Further, when a palm holding the pen comes into contact with the touch panel, the touch panel achieved under the capacitive system detects the palm touch as a touch operation. When the detection performed under the electromagnetic induction system is stopped at that time, the user cannot perform a touch operation with the pen.

The inventor recognizes the necessity for increased operability of a touch panel achieved with a combination of plural detection systems.

A terminal device of the present disclosure includes a display panel, and first and second touch detection units.

The first touch detection unit detects the coordinate position of a position indicator that comes into contact with or approaches the display panel based on a change in a magnetic field.

The second touch detection unit detects the coordinate position of an object that comes into contact with or approaches the display panel based on a change in capacitance or resistance, and determines a contact or an approach of the object corresponding to a palm to be invalid detection which is inapplicable for detection.

Further, a touch operation method of the present disclosure includes first touch detection processing and second touch detection processing.

The first touch detection processing is aimed to detect the coordinate position of a position indicator that comes into contact with or approaches a display panel, based on a change in a signal, which is caused by a change in a magnetic field.

The second touch detection processing is aimed to detect the coordinate position of an object that comes into contact with or approaches the display panel, based on a change in capacitance or resistance, and determine a contact or an approach of the object corresponding to a palm to be invalid detection which is inapplicable for detection.

According to the present disclosure, a detection unit performs detection processing except for an object corresponding to a palm, even though the object corresponding to the palm comes into contact with or approaches a touch panel. Consequently, it becomes possible to appropriately detect both an operation performed with a finger of a hand and an operation performed with a pen.

BRIEF DESCRIPTION OF DRAWINGS

FIG. 8 is a flowchart illustrating an example of touch detection processing performed according to the second embodiment of the present disclosure.

DETAILED DESCRIPTION

Figure 1:
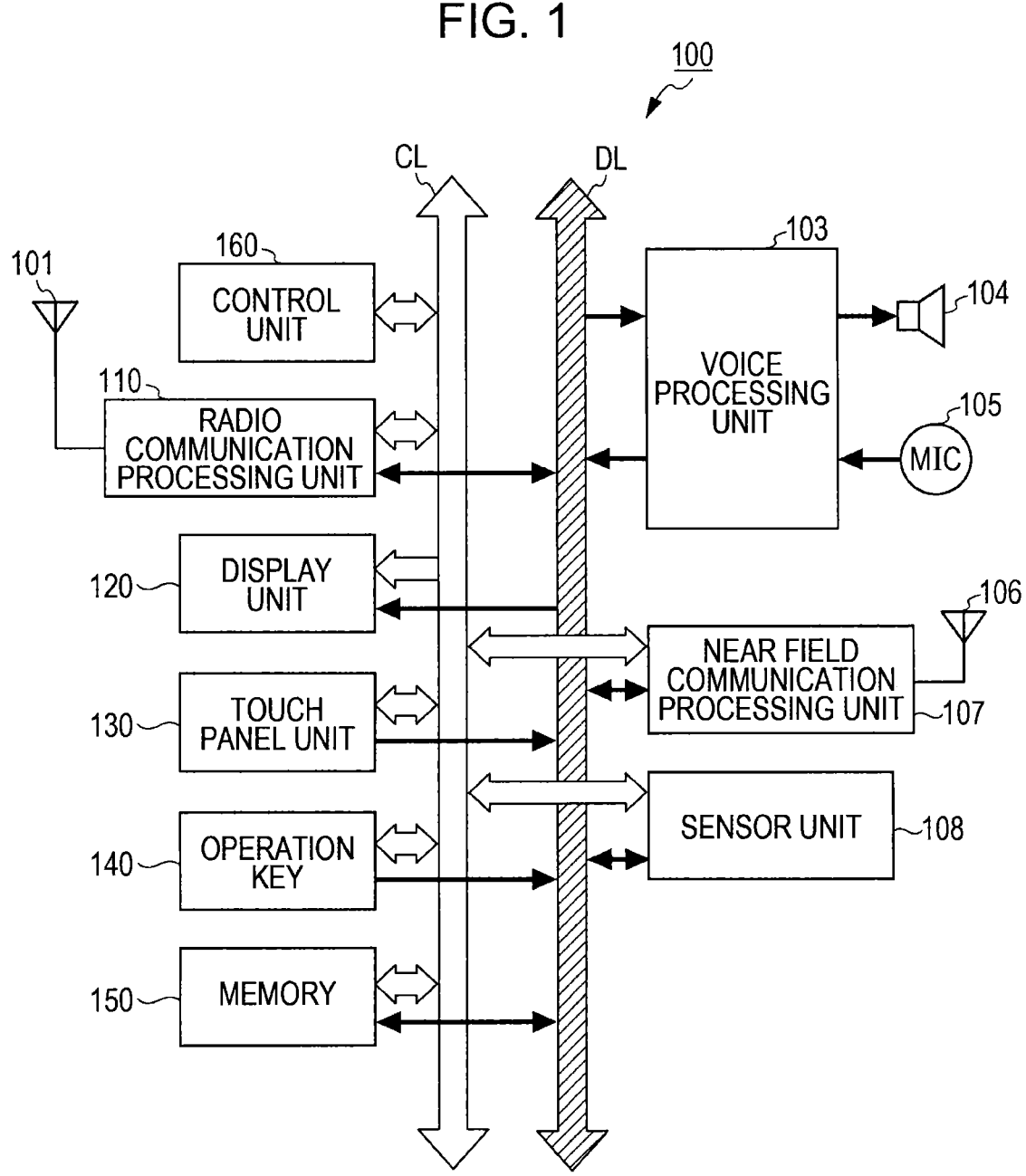
FIG. 1 is a block diagram illustrating an exemplary configuration of a terminal device according to a first embodiment of the present disclosure.

Hereinafter, example of a terminal device and a touch operation method according to embodiments of the present disclosure will be described in the following order with reference to drawings.
1. First Embodiment
1-1. Configuration of Terminal Device (FIG. 1)
1-2. Configuration of Touch Panel Unit (FIG. 2)
1-3. Exemplary Touch Detection Operations (FIGS. 3 and 4)
1-4. Exemplary Setting of Dominant Hand (FIG. 5)
1-5. Example Where Touch with Movements is Treated as Valid (FIG. 6)
2. Second Embodiment
2-1. Configuration of Touch Panel Unit (FIG. 7)
2-2. Exemplary Touch Detection Operations (FIGS. 8 and 9)
3. Exemplary Modifications 1. First Embodiment 1-1. Configuration of Terminal Device FIG. 1 is a diagram illustrating the configuration of a mobile phone terminal device 100 of the present disclosure.

The mobile phone terminal device 100 includes an antenna 101 provided to perform radio communication with a base station provided for a radio telephone. The antenna 101 is connected to a radio communication processing unit 110. The radio communication processing unit 110 performs processing to transmit and receive a radio signal under control of a control unit 160. The control unit 160 transfers a control instruction to the radio communication processing unit 110 via a control line CL. The control unit 160 reads a program (software) stored in a memory 150 via the control line CL, and controls each unit of the mobile phone terminal device 100 through execution of the program. The memory 150 included in the mobile phone terminal device 100 stores data prepared in advance including a program, etc., and data generated through a user operation. The memory 150 stores and reads data under control of the control unit 160.

During a voice conversation, conversation voice data received with the radio communication processing unit 110 is supplied to a voice processing unit 103 via a data line DL. The voice processing unit 103 performs demodulation processing for the supplied voice data, and obtains an analog voice signal. The analog voice signal obtained with the voice processing unit 103 is supplied to a speaker 104, and a voice is output from the speaker 104.

Further, during a voice conversation, the voice processing unit 103 converts a voice signal output from a microphone 105 into voice data in a transmission format. Then, the voice data converted with the voice processing unit 103 is supplied to the radio communication processing unit 110 via the data line DL. Further, the voice data supplied to the radio communication processing unit 110 is packetized and transmitted by radio.

When performing data communications and the transmission/reception of mail via a network including the Internet, etc., the radio communication processing unit 110 performs processing including transmission and reception under control of the control unit 160. For example, data received with the radio communication processing unit 102 is stored in the memory 150, and processing including display performed based on the stored data is executed based on control of the control unit 160. Further, the data stored in the memory 150 is supplied to the radio communication processing unit 110, and transmitted by radio. When there is a need to abandon the data of received mail, the control unit 160 deletes the data stored in the memory 150.

The mobile phone terminal device 100 includes a display unit 120. The display unit 120 displays an image or various information on a display panel under control of the control unit 160. As the display panel, a liquid crystal display panel or an organic electro luminescence (EL) display panel is used, for example.

Further, the mobile phone terminal device 100 includes a touch panel unit 130, and when the surface of the display panel is touched with an object including a finger, a pen, etc., the touch panel unit 130 detects the touch position.

The touch panel unit 130 includes touch panels achieved under two different systems. More specifically, the mobile phone terminal device 100 includes an electromagnetic induction-type touch panel and a capacitive-type touch panel. The electromagnetic induction-type touch panel detects that the surface of a display panel is touched with a specifically designed pen. The capacitive-type touch panel detects that the surface of the display panel is touched with a finger, etc. The configuration of the touch panel unit 130 including those touch panels will be described later.

The data of a touch position detected with the touch panel unit 130 is transferred to the control unit 160. The control unit 160 executes an active application based on the supplied touch position.

Incidentally, the electromagnetic induction-type touch panel and the capacitive-type touch panel can detect the state where a pen or a finger is brought near to the panel in addition to the state where a pen or a finger directly comes into contact with the surface of the panel. The touch detection discussed in the following descriptions includes both the detection of the state where a target object makes a contact and the detection of the state where the target object makes an approach.

Further, the mobile phone terminal device 100 includes an operation key 140. The operation information of the operation key 140 is transferred to the control unit 160. Further, the majority of operations of the mobile phone terminal device 100 are performed through a touch panel operation performed using the touch panel unit 130, and the operation key 140 only performs part of the operations.

Further, the mobile phone terminal device 100 includes a near field communication processing unit 107 to which an antenna 106 is connected. The near field communication processing unit 107 performs near field communication with a nearby terminal device or an access point. The near field communication processing unit 107 performs radio communication with a partner who stays in a range of several ten meters, for example, by applying a wireless LAN system specified as the IEEE 802.11 standard, a system referred to as Bluetooth (trademark), and so forth.

Further, the mobile phone terminal device 100 includes a sensor unit 108. The sensor unit 108 includes a sensor detecting the movement and direction of a device, such as an acceleration sensor, a magnetic field sensor, etc., and a sensor detecting the circumstances surrounding the mobile phone terminal device 100, such as a proximity sensor.

1-2. Configuration of Touch Panel Unit

Figure 2:
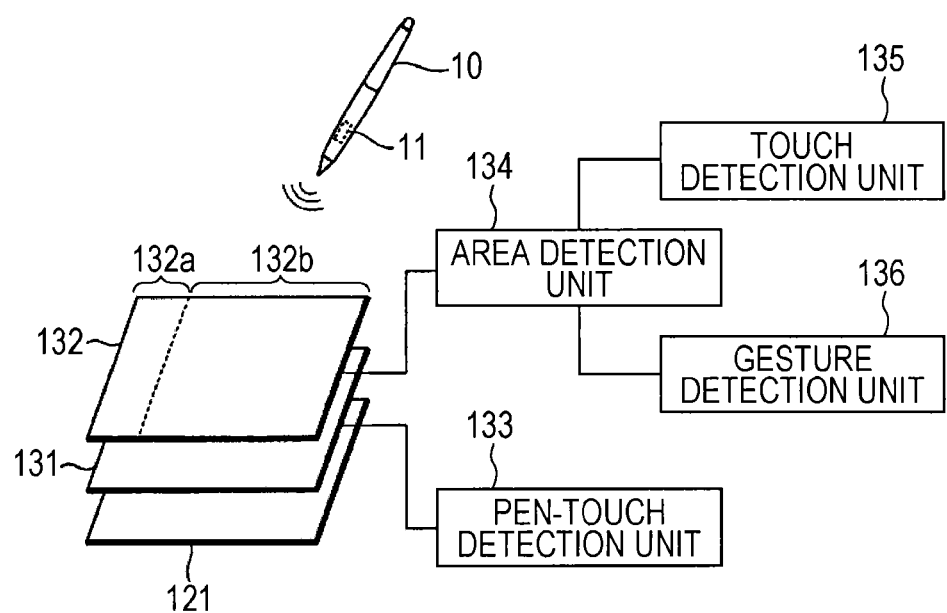
FIG. 2 is a block diagram illustrating an exemplary configuration of a touch panel unit according to the first embodiment of the present disclosure.

The configuration of the touch panel unit 130 will be described with reference to FIG. 2.

The touch panel unit 130 includes an electromagnetic induction-type touch panel 131 and a capacitive-type touch panel 132. Those touch panels 131 and 132 are provided on or under the display panel 121. Otherwise, the display panel 121 and the touch panel 131 or 132 are integrated into a single body.

The electromagnetic induction-type touch panel 131 includes plural loop coils that generate a magnetic field around the display panel 121. The loop coils provided on the touch panel 131 are connected to a pen-touch detection unit 133. The pen-touch detection unit 133 applies a signal used to generate a magnetic field to the loop coils provided on the touch panel 131. Then, the pen-touch detection unit 133 detects a signal change which is caused based on a change in the magnetic field generated due to the application. The pen-touch detection unit 133 detects the touch position of the pen 10 based on the signal change.

The pen 10, which is a position indicator, includes a resonant circuit 11 having a coil and a capacitor at the end. The resonant circuit 11 included in the pen 10 approaches the touch panel 131, which changes the magnetic field generated with a loop coil provided near the approach position. The magnetic field change is detected with the pen-touch detection unit 133 as a current change, for example.

The capacitive-type touch panel 132 has grid-like touch detection sections including a transparent electrode, and detects a touch made by an object such as a finger. The capacitive-type touch panel 132 uses a projection-type panel that can detect touches that are simultaneously made at plural positions.

A touch detection signal obtained from the electrode provided on the touch panel 132 is supplied to an area detection unit 134. The area detection unit 134 performs processing to divide the touch detection sections that are arranged on the touch panel 132 in grid-like manner into a control area 132a and a gesture area 132b. Then, the area detection unit 134 supplies a touch detection signal obtained in the control area 132a to a touch detection unit 135. Further, the area detection unit 134 supplies a touch detection signal obtained in the gesture area 132b to a gesture detection unit 136.

The setting of areas including the control area 132a and the gesture area 132b is performed with the area detection unit 134 based on an instruction transmitted from the control unit 160. Exemplary setting of the areas 132a and 132b will be described later.

The touch detection unit 135 performs the touch detection in the control area 132a based on a touch detection signal supplied from the area detection unit 134. The touch detection performed with the touch detection unit 135 is the detection of a touch of a single position in the control area 132a, which is made with a user's finger, etc.

The gesture detection unit 136 detects a gesture based on the touch detection signal supplied from the area detection unit 134. The gesture detected with the gesture detection unit 136 is a gesture achieved by touches that are simultaneously made at plural positions, for example. The gesture achieved by touches that are simultaneously made at the plural positions includes, for example, a gesture indicating a pinch-out operation performed to increase the space between two touched positions and a pinch-in operation performed to decrease the space between two touched positions. Those pinch-out operation and pinch-in operation are operations performed with touches that are made by two fingers of the user to instruct to enlarge and/or reduce an image displayed on the display panel 121. The gesture detection unit 136 may detect other gestures. Examples of the other gestures will be described later.

1-3. Exemplary Touch Detection Operations

Touch detection operations of the touch panel unit 130 will be described with reference to a flowchart of FIG. 3.

First, the touch panel unit 130 determines whether or not a signal output from the capacitive-type touch panel 132 is a signal responding to the detection of a finger touch (step S11). In the case where the touch panel unit 130 determines that the signal does not respond to the finger touch detection based on the determination, the processing proceeds to the next determination of step S12. The case where the signal does not respond to the finger touch detection is the state where an object which changes the capacitance, such as a finger, does not approach the touch panel 132 at all.

At step S12, it is determined whether or not the pen-touch detection unit 133 performs the touch detection based on a signal supplied from the electromagnetic induction-type touch panel 131. Then, when it is also determined that no touch detection is performed at step S12, the touch panel unit 130 determines that there is no input to the touch panel, and waits until a touch input is performed (step S13).

Then, when it is determined that the touch detection is performed at step S11, the area detection unit 134 determines that an input is made by a finger touch (step S14). At that time, the area detection unit 134 determines which of the control area 132a and the gesture area 132b is the position where it is determined that the touch input is made (step S15).

When the area detection unit 134 determines that the touch position is of the control area 132a based on the determination made at step S15, the touch detection unit 135 performs processing to detect the touch position (step S16).

When the area detection unit 134 determines that the touch position is of the gesture area 132b based on the determination made at step S15, the gesture detection unit 136 determines the number of simultaneously touched positions (step S17). When the determination shows that the number of the simultaneously touched positions is two or more positions, the processing proceeds to step S16, and the gesture detection unit 136 determines an input gesture based on changes in the plural touch positions.

When the gesture detection unit 136 determines that the number of the simultaneously touched positions is a single position at step S17, it is determined that the contact of a palm is detected, and the touch operation is invalidated (step S18).

Further, when it is determined that a touch is being detected with the pen 10 at step S12, the pen-touch detection unit 133 determines that a pen input is made (step S19). Then, the control unit 160 executes drawing specified by the determined pen input (step S20).

Figure 4:
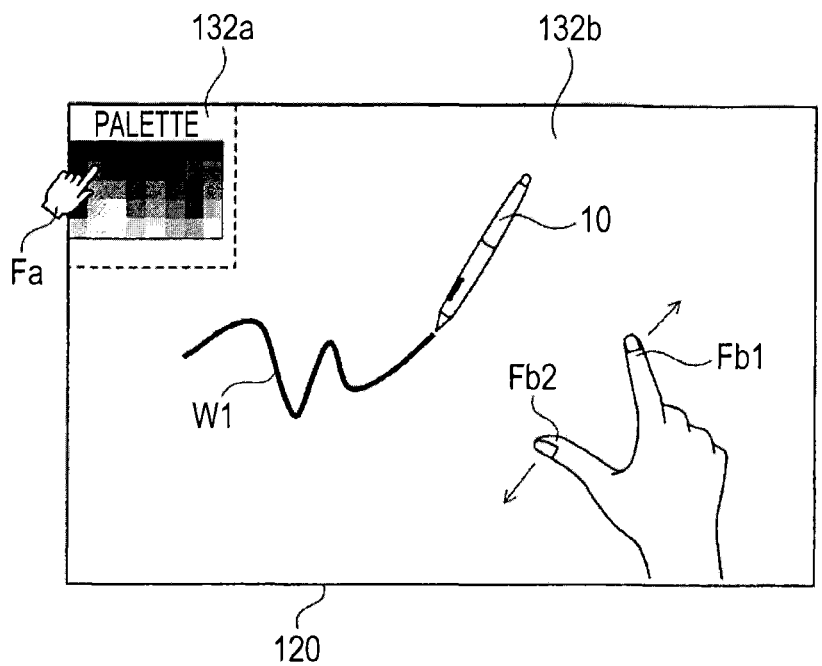
FIG. 4 is a diagram illustrating exemplary area setting performed according to the first embodiment of the present disclosure.

FIG. 4 is a diagram illustrating an example where an operation is performed with a touch of the surface of the display panel 121.

The example of FIG. 4 is an example where the control unit 160 of the mobile phone terminal device 100 activates an application provided to draw a picture on the display panel 121 with a touch made by the pen 10.

At that time, the upper-left area of a screen image displayed on the display panel 121 becomes the control area 132a, and the other area becomes the gesture area 132b. The setting of the control area 132a and the gesture area 132b is performed with the area detection unit 134 based on an instruction transmitted from the control unit 160. Incidentally, even though the boundary of the control area 132a and the gesture area 132b is illustrated as a broken line in FIG. 4 for the sake of description, the broken line is not displayed on an actual screen image.

As illustrated in FIG. 4, the control area 132a displays a palette provided to specify a color for drawing. Further, the control area 132a may display various icons provided to specify operation mode. When the size and the position of the palette or the icon that is displayed on the screen image are changeable, the control unit 160 associatingly changes the size and the position of the control area 132a.

Then, the gesture area 132b is used as an area where drawing is performed through a touch operation performed with the pen 10. That is, as illustrated in FIG. 4, the control unit 160 performs the drawing of a line W1 following changes in the position where the tip of the pen 10 touches. Further, performing an operation to delete the drawn line allows the control unit 160 to delete the line W1.

Here, the assumption is made that the user performs an operation Fa by touching the position of any of colors provided in the palette displayed in the control area 132a with a finger. At that time, a line or an area drawn with the pen 10 shows the color of the palette, which is specified through the touch operation Fa. Since the position where the touch position Fa is performed is in the control area 132a, the touch detection unit 135 detects a touch operation achieved with a single finger. On the other hand, when the same touch operation achieved with a single finger is performed in the gesture area 132b, the touch operation is disregarded. The disregard of the touch operation is the processing performed at step S18 of the flowchart of FIG. 3. Incidentally, a touch operation performed for the palette and the icons provided in the control area 132a may be achieved with a touch made by the pen 10.

Then, when operations Fb1 and Fb2 that are achieved with simultaneous touches that are made at two positions are performed in the gesture area 132b, as illustrated in FIG. 4, image processing is performed through a gesture determined by the gesture detection unit 136 based on the touch operations Fb1 and Fb2. For instance, the assumption is made in this example that the user performs a pinch-out operation to gradually increase the space between two touching fingers.

At that time, the gesture detection unit 136 detects the gesture of the pinch-out operation. Then, the control unit 160 enlarges an image drawn on the gesture area 132b based on a detected signal of the gesture. When the gesture detected with the gesture detection unit 136 is the pinch-in operation, the control unit 160 reduces the image drawn on the gesture area 132b.

Incidentally, the gesture detection unit 136 may detect gestures other than the pinch-out and the pinch-in. That is, the gesture detection unit 136 may detect various gestures that are input through touches that are simultaneously made with plural fingers. For example, the gesture detection unit 136 may detect a swipe gesture causing the touch positions of plural fingers to move almost parallel. In the case of the swipe, touches may be simultaneously made with three or more fingers in addition to the case of simultaneous touch that are made by two fingers.

Thus, the touch panel unit 130 performs the touch detection processing varying between the control area 132a and the gesture area 132b, which allows for performing a favorable touch operation free from a malfunction. That is, the only area where a touch operation can be performed with a single finger is the control area 132a which is the area of a part of the displayed screen image. Therefore, even though a part of the palm holding the pen 10 is brought into contact with or brought near to the surface of the display panel 121, a touch operation performed with the palm is not detected as long as the contact position is in the gesture area 132b.

Consequently, drawing can be favorably performed with the pen 10 in the gesture area 132b in the state where no malfunction occurs due to the misdetection of the palm.

Further, since the control area 132a is arranged on the upper left defined in the displayed screen image as illustrated in FIG. 4, there is little possibility that the palm holding the pen 10 comes into contact with the control area 132a when drawing is performed in the gesture area 132b. Usually, when the user holds the pen 10 with the right hand to perform drawing work, the palm is positioned right below the pen 10. Consequently, even though a touch operation achieved with a single finger is detected in the upper-left control area 132a, there is little possibility that the control area 132a misdetects the palm. That is, the touch detection can be favorably performed in the control area 132a.

1-4. Exemplary Setting of Dominant Hand

When the operating user is right-handed, the above-described advantages are achieved by providing the control area 132a on the upper left defined in the displayed screen image. When a left-handed user holding the pen by the left hand performs an operation, it is desirable that the position of the control area 132a be the upper right. Therefore, the arrangement position of the control area 132a may be changed in accordance with the dominant hand of a user operating the mobile phone terminal device 100.

Figure 5:
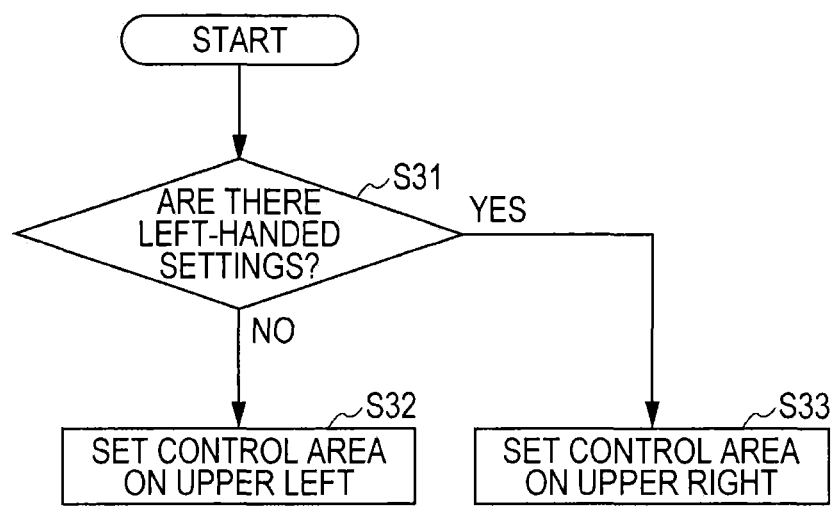
FIG. 5 is a flowchart illustrating exemplary setting of a dominant hand, which is performed according to the first embodiment of the present disclosure.

The flowchart of FIG. 5 is a diagram illustrating processing performed by the control unit 160 to set the position of the control area 132*a* based on the setting of the dominant hand.

The control unit 160 determines whether or not settings are made that the user is left-handed, as settings relating to the operations of the mobile phone terminal device 100 (step S31). When the determination shows no left-handed settings, the control unit 160 arranges the control area 132*a* on the upper left defined in the displayed screen image (step S32), as illustrated in FIG. 4. Further, when the determination made at step S31 shows that the left-handed settings are made, the control unit 160 arranges the control area 132*a* on the upper right defined in the displayed screen image (step S33). The upper right-arrangement state denotes an arrangement achieved by laterally flipping the arrangement of FIG. 4, for example.

By thus changing the position of the control area 132*a* based on the user's dominant-hand settings, it becomes possible to cope with the case where the user is left-handed.

1-5. Example Where Touch with Movements is Treated as Valid

Figure 3:
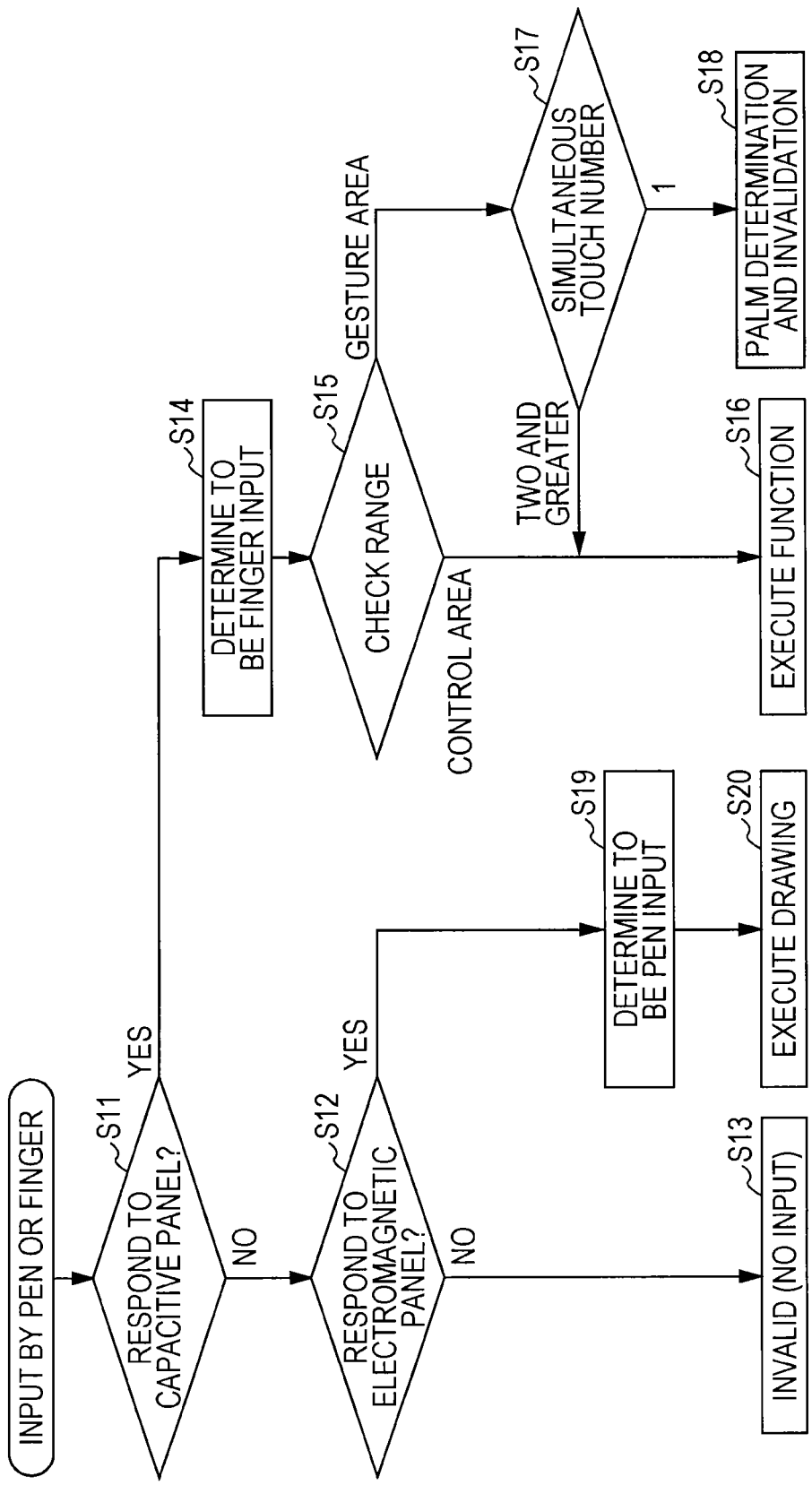
FIG. 3 is a flowchart illustrating an example of touch detection processing performed according to the first embodiment of the present disclosure.

According to the flowchart of FIG. 3, the touch panel unit 130 only treats simultaneous touches that are made with two or more fingers on the gesture area 132*b* as a valid touch operation. On the other hand, the touch panel unit 130 may treat an operation involving movements with the passage of time as a valid gesture, even though a touch is made with a single finger.

Figure 6:
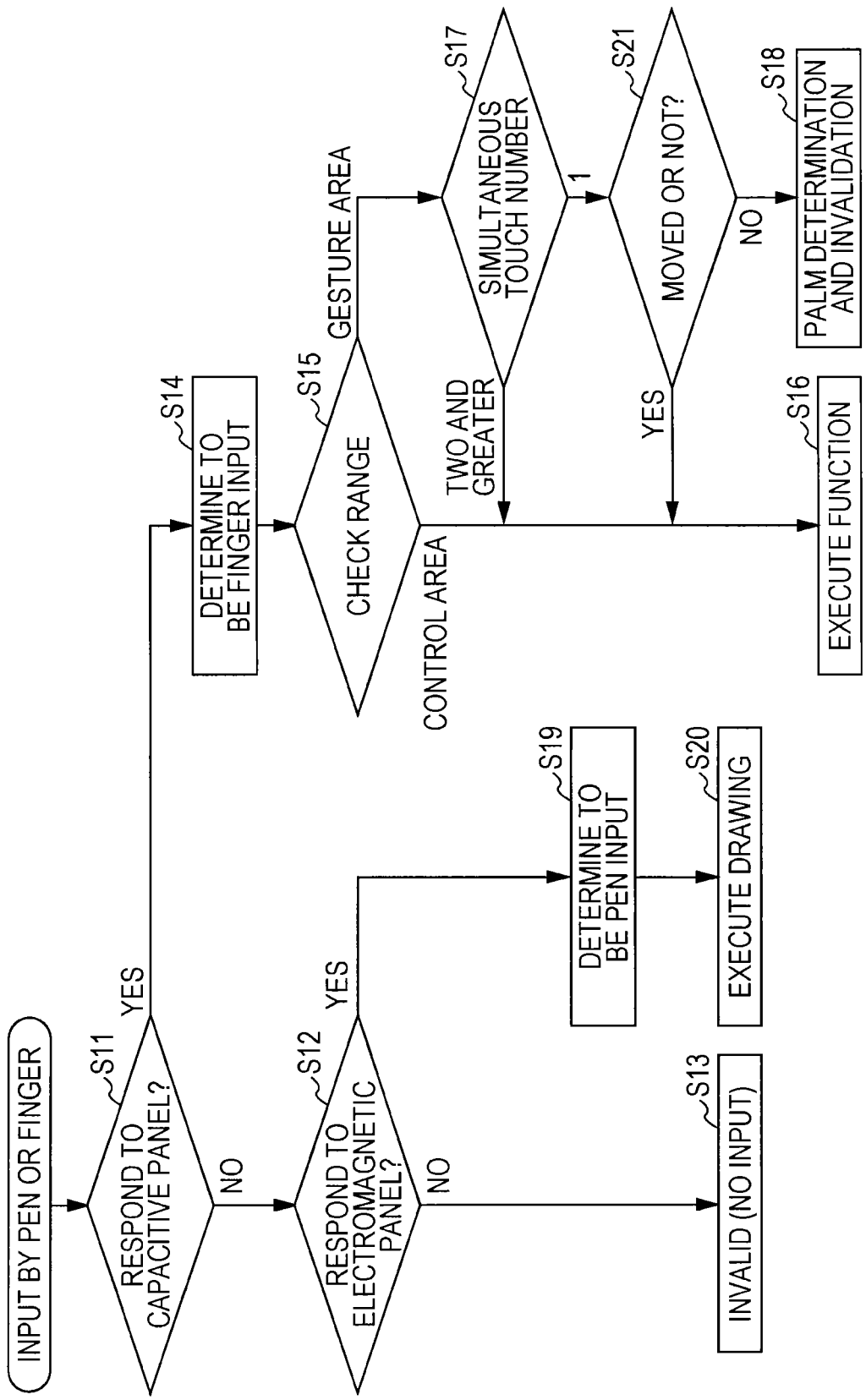
FIG. 6 is a flowchart illustrating another example of the touch detection processing (an example where a touch with movements is treated as valid) performed according to the first embodiment of the present disclosure.

The flowchart of FIG. 6 is a diagram illustrating exemplary processing performed with the touch panel unit 130 in that circumstance. In the flowchart of FIG. 6, the processing of step S11 to step S17 is the same as that of the previously described flowchart of FIG. 3. Therefore, the descriptions are omitted.

Then, when the gesture detection unit 136 determines that the number of the simultaneous touches that are made in the gesture area 132*b* is a single position at step S17, the gesture detection unit 136 determines whether or not the single touch position is moved (step S21). When the determination indicates that the touch is made at the moving single position, the processing proceeds to step S16, and the gesture detection unit 136 detects a gesture based on the movement of the single touch position. Then, when it is determined that the touch is made at the single position and few movements are involved based on the determination made at step S21, the processing proceeds to step S18, and the gesture detection unit 136 determines the operation performed at that time to be an invalid touch operation.

An exemplary touch made at a moving single position will be described. For example, when a single touch position is changed as if being flicked in an upward direction, the gesture detection unit 136 determines that a flick operation is performed in an upward direction. At that time, the control unit 160 moves the entire image displayed on the display panel 121 in an upward direction. Further, when the gesture detection unit 136 determines that a flick operation is performed in a downward direction, the control unit 160 moves the entire image displayed on the display panel 121 in a downward direction.

When movements are thus involved in a touch operation achieved with a single finger, the gesture detection unit 136 determines a gesture based on the movements, and the control unit 160 performs the corresponding processing, which allows for performing operations that are achieved with a larger number of types of gestures.

2. Second Embodiment

2-1. Configuration of Touch Panel Unit

Next, an example of a second embodiment will be described with reference to FIG. 7 to FIG. 9. In the FIG. 7 to FIG. 9, the same components as those of FIG. 1 to FIG. 6 that are previously described in the first embodiment are designated by the same signs, and the detailed descriptions are omitted.

In the example of the second embodiment, processing of the capacitive-type touch panel 132 provided in the touch panel 130, which is performed to differentiate between a palm touch and a touch made with a finger, is different from the first embodiment. To the configuration of the entire terminal device excluding the touch panel unit 130, FIG. 1 which is previously described in the first embodiment is applied.

Figure 7:
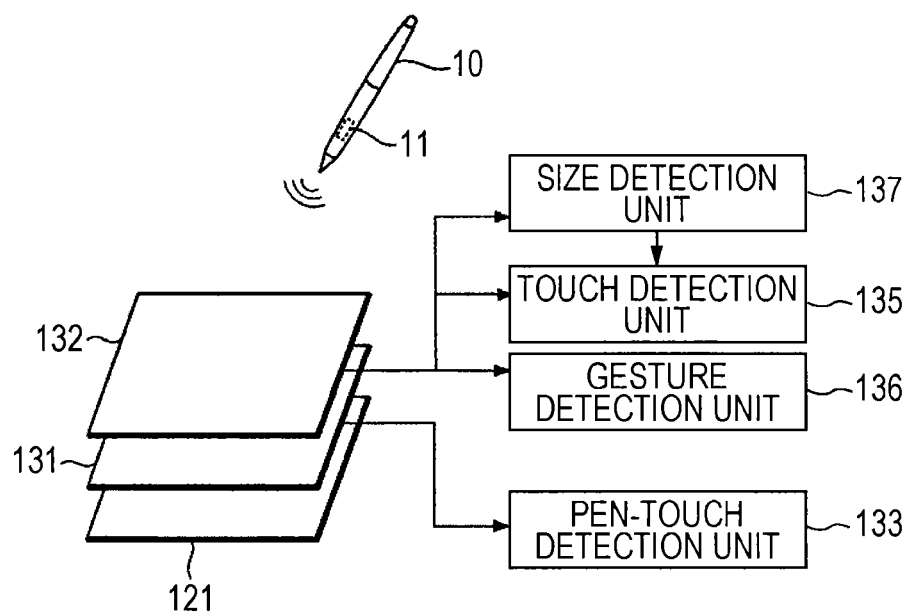
FIG. 7 is a block diagram illustrating an exemplary configuration of a touch panel unit according to a second embodiment of the present disclosure.

FIG. 7 is a diagram illustrating the configuration of the touch panel unit 130 used in the example of the second embodiment.

The touch panel unit 130 includes the electromagnetic induction-type touch panel 131 and the capacitive-type touch panel 132. Those touch panels 131 and 132 are provided on or under the display panel 121. Otherwise, the display panel 121 and the touch panel 131 or 132 are incorporated into a single body.

The loop coils that are arranged on the electromagnetic induction-type touch panel 131 are connected to the pen-touch detection unit 133. The pen-touch detection unit 133 applies a signal causing the loop coils that are arranged on the touch panel 131 to generate a magnetic field, and detects a signal change occurring based on a change in the magnetic field generated due to the application. The pen-touch detection unit 133 detects the touch position of the pen 10 based on the signal change.

The capacitive-type touch panel 132 has grid-like touch detection sections including a transparent electrode, and detects a touch made by an object such as a finger.

A touch detection signal obtained from the electrode provided on the touch panel 132 is supplied to the touch detection unit 135, the gesture detection unit 136, and the size detection unit 137.

The size detection unit 137 detects that the number of sections where touches are simultaneously detected, of the touch detection sections that are arranged on the touch panel 132, is a fixed number and greater. That is, the size detection unit 137 detects that an area where the touches are simultaneously detected is a fixed area and greater.

When the size detection unit 137 detects the simultaneous touches of the fixed number and greater of the touch detection sections, the touch detection unit 135 is instructed to invalidate a detected touch operation. When the number of the simultaneous touches of the touch detection sections is less than the fixed number, the size detection unit 137 instructs the touch detection unit 135 to validate a detected touch operation.

As for the gesture detection unit 136, a valid detection operation is performed at all times without imposing restrictions that are put based on instructions from the size detection unit 137.

2-2. Exemplary Touch Detection Operations

The touch detection operations of the touch panel unit 130, which are performed in the example of the second embodiment, will be described with reference to a flowchart of FIG. 8.

First, the touch panel unit 130 determines whether or not a signal output from the capacitive-type touch panel 132 is a signal which responds to the finger touch detection (step S11). When the touch panel unit 130 determines that the signal does not respond to the finger touch detection based on the determination, the processing proceeds to the next determination of step S12.

At step S12, the pen-touch detection unit 133 determines whether or not the touch detection is performed based on a signal supplied from the electromagnetic induction-type touch panel 131. At the step S12, the processing described at steps S19 and S20 of the flowchart of FIG. 3 is applied to processing performed when the pen-touch detection unit 133 performs the pen touch detection. Further, when the pen-touch detection unit 133 does not perform the pen-touch detection at step S12, the invalidation processing of step S13, which is described in the flowchart of FIG. 3, is performed.

Then, when the touch panel unit 130 determines that the signal which responds to the finger touch detection is output at step S11, it is determined whether or not the size of a currently-made touch, which is then determined with the size detection unit 137, is less than a fixed area (step S22). When the determination indicates that it is less than the fixed area, the touch detection unit 135 executes the detection of a touch position, and the control unit 160 executes functions based on the detected touch position (step S23).

Further, when it is determined that the size of the currently-made touch determined with the size detection unit 137 is the fixed area and greater at step S22, it is determined that a palm comes into contact with the surface of the display panel 121, and the touch detection unit 136 invalidates the touch position detection (step S24).

FIG. 9 is a diagram illustrating an example where it is determined whether or not the size of a currently-made touch is less than the fixed area at step S22 of the flowchart of FIG. 8. An arrangement 200 of the grid-like touch detection sections illustrated in FIG. 9 denotes exemplary sections where the touch panel unit 130 determines a touch.

Figure 9B:
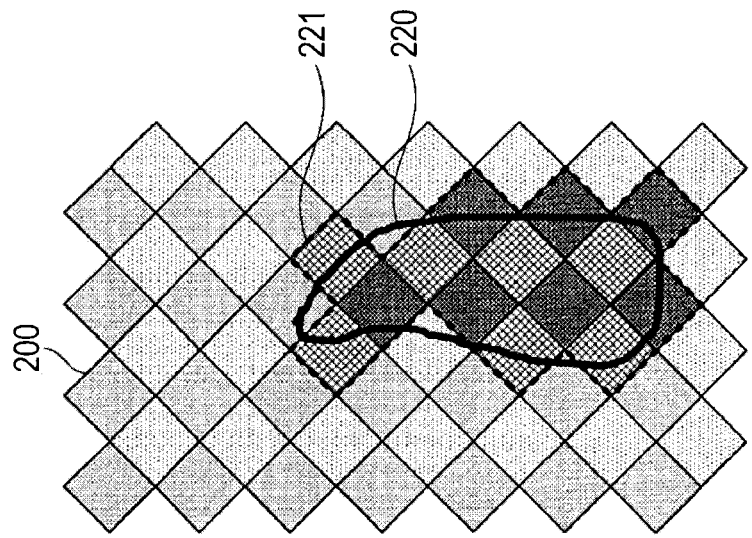
FIGS. 9A and 9B are diagrams illustrating a comparison of the case where a touch is made with a finger and the case where a touch is made with a palm, which is made according to the second embodiment of the present disclosure.
Figure 9A:
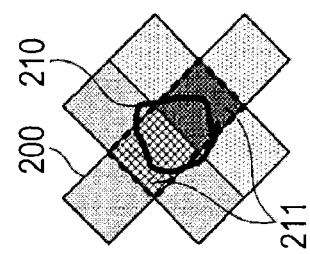

FIG. 9A is an example where the touch panel unit 130 detects a finger touch. That is, a touch detection area 211 including two sections is detected from an actual finger-touch area 210 which is a range where a palm comes into contact with the panel, for example.

FIG. 9B is an example where the touch panel unit 130 detects a touch made with a palm. In that case, an example where a touch detection area 221 including fourteen sections is detected from an actual area 220 which is a range where the palm comes into contact with the panel is illustrated.

When the detections that are illustrated in FIG. 9 are performed, the size detection unit 137 sets five touch detection sections as a threshold value performing the area determination, for example. Then, when the number of simultaneously touched sections is less than the five touch detection sections, the size detection unit 137 determines that a finger touch is made. Further, when the number of the simultaneously touched sections denotes five or more touch detection sections, the size detection unit 137 determines that a palm touch is made.

Thus, the size detection unit 137 can correctly determine the touch of a small area such as a finger and the touch of a large area such as a palm based on the touch section number corresponding to the touch area. Then, the case where the touch function is executed and the case where the touch function is disregarded are set in accordance with the distinction between the finger and the palm, which allows the touch panel unit 130 to appropriately input both a finger-touch operation and a pen-touch operation.

3. Exemplary Modifications

Incidentally, the processing performed to provide the gesture area and the control area, which is described in the first embodiment, and the processing performed to detect a palm based on the touched area for invalidation, which is described in the second embodiment, may be performed in combination. For example, the gesture area and the control area that are described in the first embodiment are provided as a touch panel unit. Then, when a palm is detected within the gesture area based on the touched-area determination described in the second embodiment, the touch panel unit may perform the invalidation processing.

Further, in the example of each embodiment, the determination processing described in the flowcharts of FIG. 3 and FIG. 8 is performed with the touch panel unit. On the other hand, it may be arranged that the touch panel unit only performs the touch position detection, and the control unit 160 illustrated in FIG. 1 performs the determination processing described in the flowcharts of FIG. 3 and FIG. 8 based on the touch position information supplied from the touch panel unit.

Further, it may be arranged that a program (software) executing the determination processing described in the flowcharts of FIG. 3 and FIG. 8 is generated, and the program is stored in a storage medium. By preparing the program stored in the storage medium, a terminal device where the program is installed becomes a terminal device executing the processing of the present disclosure.

Further, in the example of each embodiment, the example where the electromagnetic induction-type touch panel and the capacitive-type touch panel are combined has been described. On the other hand, as for the capacitive-type touch panel, touch panels that are achieved under the other systems to detect a touch of a finger, etc. may be applied. For example, a resistive film-system touch panel detecting a change in the resistance value of a transparent electrode provided on the touch panel may be applied. Further, even though the example where the electromagnetic induction-type touch panel detects a specifically designed pen has been described, a position indicator having the other shape may be detected.

Further, the configurations and the processing that are disclosed in claims of the present disclosure are not limited to the examples of the above-described embodiments. It should be understood by those skilled in the art that various modifications, combinations, and other exemplary embodiments may occur depending on design and/or other factors insofar as they are within the scope of the claims or the equivalents thereof, as a matter of course.

Incidentally, the present disclosure may be configured as below.

(1) An information processing device including: a display; a first sensor configured to detect a first object that comes into contact with or approaches the display based on a change in a magnetic field; and a second sensor configured to detect a second object that comes into contact with or approaches the display based on a change in capacitance or resistance.

(2) The information processing device of (1), further including: circuitry configured to determine a first coordinate position of the first object based on an output of the first sensor, and determine a second coordinate position of the second object based on an output of the second sensor.

(3) The information processing device of (2), wherein the circuitry is further configured to execute a predetermined function based on the detected first and second coordinate positions.

(3) The information processing device of any of (1) to (2), further including: circuitry configured to determine that the second object corresponds to a palm of a user's hand based on an output of the second sensor, and ignore the detection when the second object is determined to correspond to the palm of the user's hand.

(4) The information processing device of any of (1) to (3), wherein the second sensor includes a first detecting area and a second detecting area.

(5) The information processing device of (4), further including: a user interface configured to receive an input indicating a user's dominant hand; and circuitry configured to set an arrangement of the first detecting area and the second detecting area based on the received input.

(6) The information processing device of any of (4) to (5), wherein the circuitry is configured to detect a gesture input by a user when an output of the second sensor indicates that the second object is detected in the first detecting area, and execute a predetermined function based on the detected gesture.

(7) The information processing device of (6), wherein the circuitry is configured to detect the gesture input when the output of the second sensor indicates that a plurality of the second objects are simultaneously detected in the first detecting area.

(8) The information processing device of any of (6) to (7), wherein the circuitry is configured to detect the gesture input when the output of the second sensor indicates that a single second object is detected in the first detecting area and the single second object moves within the first detecting area.

(9) The information processing device of any of (4) to (8), wherein the circuitry is configured to determine that the second object detected in the first detecting area corresponds to a palm of a user's hand based on an output from the second sensor, and ignore the detection when the second object is determined to correspond to the palm of the user's hand.

(10) The information processing device of (9), wherein the circuitry is configured to determine that the second object corresponds to the palm of the user's hand when the output of the second sensor indicates that a single touch input is detected in the first detecting area.

(12) The information processing device of any of (4) to (10), wherein the circuitry is configured to detect a single touch input by a user when an output of the second sensor indicates that the second object is detected in the second detecting area, and execute a predetermined function based on the detected single touch input.

(13) The information processing device of any of (4) to (12), wherein the circuitry is configured to determine that the second object detected in the second detecting area corresponds to a palm of a user's hand based on an output from the second sensor, and accept the detection when the second object is determined to correspond to the palm of the user's hand.

(14) A method performed by an information processing device, the method including: detecting, at a first sensor, a first object that comes into contact with or approaches a display of the information processing device based on a change in a magnetic field; and detecting, at a second sensor, a second object that comes into contact with or approaches the display based on a change in capacitance or resistance.

(15) A non-transitory computer-readable medium including computer program instructions, which when executed by an information processing device, cause the information processing device to: detect, at a first sensor, a first object that comes into contact with or approaches a display of the information processing device based on a change in a magnetic field; and detect, at a second sensor, a second object that comes into contact with or approaches the display based on a change in capacitance or resistance.

The invention claimed is:

1. An information processing device comprising:
   a display panel;
   an electromagnetic induction-type touch panel disposed on, under or integrally formed with the display panel and having a surface area substantially similar to a surface area of the display panel, the electromagnetic induction-type panel configured to detect a first object that comes into contact with or approaches the display panel based on a change in a magnetic field; and
   a capacitive-type touch panel disposed on, under or integrally formed with the display panel and having a surface area substantially similar to a surface area of the display panel, the capacitive-type touch panel configured to detect a second object that comes into contact with or approaches the display panel based on a change in capacitance or resistance, wherein the capacitive-type touch panel includes a control detecting area and a gesture detecting area, which is an area that is different from the control detecting area,
   wherein
   the first object is a pen or stylus, and
   the second object is a user's finger; and
   circuitry is configured to
   control the display panel to display, in the control detecting area, a user interface including a plurality of options each corresponding to a different processing operation performed in response to an input to the electromagnetic induction-type touch panel by the pen or stylus;
   determine whether a touch input is received at a position corresponding to one of the plurality of options displayed on the user interface based on an output of the capacitive-type touch panel;
   set, as a selected processing operation corresponding to the pen or stylus, a processing operation corresponding to the one of the plurality of options displayed on the user interface;
   detect an input by the pen or stylus in the gesture detecting area based on an output of the electromagnetic induction-type touch panel; and
   perform the one of the plurality of operations in response to the detection of the input by the pen or stylus.

2. The information processing device of claim 1, wherein the circuitry is configured to determine a first coordinate position of the first object based on an output of the electromagnetic induction-type touch panel, and determine a second coordinate position of the second object based on an output of the capacitive-type touch panel.

3. The information processing device of claim 2, wherein the circuitry is further configured to execute a predetermined function based on the detected first and second coordinate positions.

4. The information processing device of claim 1, further comprising:

a user interface configured to receive an input indicating a user's dominant hand, wherein
the circuitry is configured to set an arrangement of the control detecting area and the gesture detecting area based on the received input.

5. The information processing device of claim 1, wherein the circuitry is configured to detect a gesture input by a user when an output of the capacitive-type touch panel indicates that the second object is detected in the gesture detecting area, and execute a predetermined function based on the detected gesture.

6. The information processing device of claim 5, wherein the circuitry is configured to detect the gesture input when the output of the capacitive-type touch panel indicates that a plurality of the second objects are simultaneously detected in the gesture detecting area.

7. The information processing device of claim 5, wherein the circuitry is configured to detect the gesture input when the output of the capacitive-type touch panel indicates that a single second object is detected in the gesture detecting area and the single second object moves within the gesture detecting area.

8. The information processing device of claim 1, wherein the circuitry is configured to detect a single touch input by a user when an output of the capacitive-type touch panel indicates that the second object is detected in the control detecting area, and execute a predetermined function based on the detected single touch input.

9. The information processing device of claim 1, wherein the circuitry is configured to determine that the second object detected in the control detecting area corresponds to a palm of a user's hand based on an output from the capacitive type touch panel, and accept the detection when the second object is determined to correspond to the palm of the user's hand.

10. The information processing device of claim 1, wherein
the electromagnetic induction-type touch panel comprises a plurality of loop coils configured to generate a magnetic field around the display panel.

11. The information processing device of claim 1, wherein the capacitive-type touch panel comprises grid-shaped touch detection sections including a transparent electrode.

12. The information processing device of claim 1, wherein the circuitry is configured to:
determine whether a touch input is detected in the control detecting area or the gesture detecting area based on an output of the capacitive-type touch panel;
execute, in a case that the touch input is detected in the control detecting area, a control function in response to the received touch input.

13. The information processing device of claim 1, wherein the circuitry is configured to:
process a detection of the second object by the capacitive-type touch panel differently depending on a position corresponding to the display panel at which the second object is detected;
determine whether a size of the second object that comes into contact with or approaches the display panel is greater than a predetermined size based on an output of the capacitive-type touch panel; and
determine that the second object corresponds to a palm of a user's hand in a case that it is determined that the size of the second object is greater than the predetermined size, and ignore the detection when the second object is determined to correspond to the palm of the user's hand.

14. The information processing device of claim 1, wherein
the user interface displayed in the control detecting area includes a color palette, and
the plurality of options displayed on the user interface correspond to a plurality of color options.

15. A method performed by an information processing device, the method comprising:
detecting, at an electromagnetic induction-type touch panel disposed on, under or integrally formed with a display panel and having a surface area substantially similar to a surface area of the display panel, a first object that comes into contact with or approaches the display panel of the information processing device based on a change in a magnetic field;
detecting, at a capacitive-type touch panel disposed on, under or integrally formed with the display panel and having a surface area substantially similar to a surface area of the display panel, the capacitive-type touch panel, a second object that comes into contact with or approaches the display panel based on a change in capacitance or resistance, wherein the capacitive-type touch panel includes a control detecting area and a gesture detecting area, which is an area that is different from the control detecting area, the first object is a pen or stylus, and the second object is a user's finger;
controlling the display panel to display, in the control detecting area, a user interface including a plurality of options each corresponding to a different processing operation performed in response to an input to the electromagnetic induction-type touch panel by the pen or stylus;
determining whether a touch input is received at a position corresponding to one of the plurality of options displayed on the user interface based on an output of the capacitive-type touch panel;
setting, as a s elected processing operation corresponding to the pen or stylus, a processing operation corresponding to the one of the plurality of options displayed on the user interface;
detecting an input by the pen or stylus in the gesture detecting area based on an output of the electromagnetic induction-type touch panel; and
performing the one of the plurality of operations in response to the detection of the input by the pen or stylus.

16. A non-transitory computer-readable medium including computer program instructions, which when executed by an information processing device, cause the information processing device to:
detect, at an electromagnetic induction-type touch panel disposed on, under or integrally formed with a display panel and having a surface area substantially similar to a surface area of the display panel, a first object that comes into contact with or approaches the display panel of the information processing device based on a change in a magnetic field; detect, at a capacitive-type touch panel disposed on, under or integrally formed with the display panel and having a surface area substantially similar to a surface area of the display panel, the capacitive-type touch panel, a second object that comes into contact with or approaches the display panel based on a change in capacitance or resistance, wherein the capacitive-type touch panel includes a control detecting area and a gesture detecting area, which is an area that is different from the control detecting area, the first object is a pen or stylus, and the second object is a user's finger;

control the display panel to display, in the control detecting area, a user interface including a plurality of options each corresponding to a different processing operation performed in response to an input to the electromagnetic induction-type touch panel by the pen or stylus;

determine whether a touch input is received at a position corresponding to one of the plurality of options displayed on the user interface based on an output of the capacitive-type touch panel;

set, as a selected processing operation corresponding to the pen or stylus, a processing operation corresponding to the one of the plurality of options displayed on the user interface;

detect an input by the pen or stylus in the gesture detecting area based on an output of the electromagnetic induction-type touch panel; and perform the one of the plurality of operations in response to the detection of the input by the pen or stylus.

* * * * *